United States Patent [19]

Clarke et al.

[11] Patent Number: 5,800,716
[45] Date of Patent: Sep. 1, 1998

[54] PROCESSES FOR THE TREATMENT OF ACIDIC LIQUORS AND FOR THE PRODUCTION OF COMMERCIAL PRODUCTS THEREBY

[75] Inventors: Neil Clarke; John Harris Newton, both of Warrington, England

[73] Assignee: Laporte Industries Limited, England

[21] Appl. No.: 669,563

[22] PCT Filed: Oct. 11, 1994

[86] PCT No.: PCT/GB94/02216

§ 371 Date: Apr. 19, 1996

§ 102(e) Date: Apr. 19, 1996

[87] PCT Pub. No.: WO95/11199

PCT Pub. Date: Apr. 27, 1995

[30] Foreign Application Priority Data

Oct. 21, 1993 [GB] United Kingdom ............... 9321732

[51] Int. Cl.$^6$ ............................................. C02F 1/56
[52] U.S. Cl. .................... 210/711; 210/716; 210/728; 252/175; 252/181; 423/122; 423/132; 423/140; 423/150.3; 423/DIG. 2
[58] Field of Search ................................. 210/710, 711, 210/716, 722, 724, 723, 726, 727, 728; 252/175, 181; 423/DIG. 2, 140, 150.3, 122, 132, DIG. 1

[56] References Cited

U.S. PATENT DOCUMENTS

| | | | |
|---|---|---|---|
| 1,197,123 | 9/1916 | Hoover. | |
| 2,128,569 | 8/1938 | Velz | 210/711 |
| 2,177,857 | 10/1939 | Bevan | 210/711 |
| 2,433,458 | 12/1947 | Kahn et al. | 210/723 |
| 2,692,229 | 10/1954 | Heise | 210/722 |
| 3,511,777 | 5/1970 | Spinola | 210/710 |
| 3,738,932 | 6/1973 | Kostenbader | 210/713 |
| 3,814,686 | 6/1974 | Swales | 210/716 |
| 3,890,226 | 6/1975 | Hanami et al. | 423/629 |
| 4,388,195 | 6/1983 | von Hagel et al. | 210/709 |
| 4,415,467 | 11/1983 | Piepho | 252/181 |
| 4,448,696 | 5/1984 | White | 210/711 |

FOREIGN PATENT DOCUMENTS

| | | |
|---|---|---|
| 0377766 | 7/1990 | European Pat. Off.. |
| 1933035 | 1/1971 | Germany. |
| 2411346 | 9/1975 | Germany. |
| 1551255 | 8/1979 | United Kingdom. |

*Primary Examiner*—Peter A. Hruskoci
*Attorney, Agent, or Firm*—Klauber & Jackson

[57] ABSTRACT

A process for the treatment of aqueous acidic liquors containing dissolved aluminum and/or iron compounds to produce an aluminum and/or iron sulfate water-treatment product is characterized by the combination of steps comprising contacting the liquor with a basic material capable of reacting with the dissolved aluminum and/or iron compound to precipitate aluminum and/or iron values, separating the precipitate in the form of a cake or slurry from the remaining liquor, treating the cake or slurry with sulfuric acid to re-dissolve aluminum and/or iron values and to produce a solution of aluminum and/or iron sulfate and separating suspended solid matter from the solution. The liquor may be a waste product from industrial processes or may be a mine effluent and the process avoids the need to dispose of these to waste. Where the liquor is derived from the acid activation of an aluminosiliceous mineral, the product contains dissolved silica, and a substantial quality of an oil bleaching agent is produced as a byproduct. The product may be mixed with a low molecular weight cationic polymer to give an enhanced flocculation performance.

15 Claims, No Drawings

PROCESSES FOR THE TREATMENT OF ACIDIC LIQUORS AND FOR THE PRODUCTION OF COMMERCIAL PRODUCTS THEREBY

This invention relates to a process for the treatment of acidic liquors, to a process for the production of valuable water treatment agents and other valuable commercial products thereby and to the agents or products so produced.

Aqueous acidic liquors containing dissolved aluminium and/or iron compounds are produced on a large scale, mainly as waste products, in various industries. An example of this is the liquor produced from the treatment of aluminosiliceous or aluminoferrosiliceous minerals with acids such as, for example, sulphuric acid or hydrochloric acid, to increase the surface area of the minerals and to activate them for various uses, for example for edible oil purification or for paper coating applications. The acidic liquor so produced contains a substantial proportion of dissolved aluminium and/or iron compounds. This liquor may be neutralized with lime to produce a cake or slurry for disposal to land-fill. Another example is acidic mine drainage water which may contain a substantial proportion of dissolved iron compounds and may likewise be neutralized with lime to produce a slurry which is usually aerated to convert the iron to the ferric form and allowed to settle to produce a solid waste product for disposal. Waste pickling liquors also contain substantial quantities of dissolved iron compounds. The disposal of such waste products represents a considerable expense and is increasingly considered to be ecologically undesirable. It would be of considerable benefit to industry and to the environment to provide means for utilising these and other similar liquors as raw materials for further processing.

The present invention provides a process for the treatment of aqueous acidic liquors containing dissolved aluminium and/or iron compounds to produce an aluminium and/or iron sulfate water-treatment product, the process being characterized by the combination of steps comprising contacting the liquor with a basic material capable of reacting with the dissolved aluminium and/or iron compounds to precipitate aluminium and/or iron values, separating the precipitate in the form of a cake or slurry from the remaining liquor, treating the cake or slurry with sulphuric acid to re-dissolve aluminium and/or iron values and to produce a solution of aluminium and/or iron sulfate and separating suspended solid matter from the solution.

The acidic liquor to be treated according to the invention is very suitably derived from the acid treatment of aluminosiliceous or aluminoferrosiliceous minerals such as smectites, kaolinites, attapulgites, sepiolites or the like and particularly, within the smectites, montmorillonites. In this case the water treatment product is an aluminium sulphate or an aluminium-iron sulphate. In the case of acidic liquors derived from purely ferrous sources, such as the acidic mine drainage liquors referred to above, which may contain up to about 1000 mg/l Fe and up to about 4000 mg/l sulphate, or more, an iron sulphate water treatment product is produced. The invention will be described hereafter with particular reference to the treatment of liquors derived from the acid treatment of montmorillonite clay minerals. However, the description is to be modified as required to relate to the treatment of liquors derived from the acid treatment of other materials indicated above, or to the treatment of other acidic aluminium and/or iron containing liquors, unless the context requires otherwise. The acidic liquor may have a pH below 4 but more usually below 3, for example from 0.5 to 3.

The term "liquor" is used herein in a practical sense to include reference to liquid plant or mine effluent including any suspended solid matter which may be present.

The montmorillonite clay minerals, which term is used to include bentonites, are layered minerals composed of an octahedrally coordinated aluminium layer connected by the sharing of oxygen atoms to two adjacent tetrahedrally coordinated silicon layers. The aluminium in the octahedral layer is partially substituted by iron and may also be substituted by magnesium or other atoms and the silicon in the tetrahedral layer may be partially substituted by aluminium. Such minerals have appreciable surface area which is increased by acid treatment for a variety of applications. The effect of acid treatment is to dissolve aluminium and iron preferentially from the octahedral layer. Where the treating acid has been sulphuric acid, as is usual, the liquor resulting from the acid treatment contains dissolved aluminium and iron sulphates. The treating acid may alternatively be hydrochloric or other strong mineral acid or a suitable strong organic acid and the composition of the resulting liquor will differ correspondingly. A typical acidic liquor produced from the acid treatment of a montmorillonite clay mineral may contain from 0.5% to 4%, for example 1.5%, $Al_2O_3$, 0.2% to 3%, for example 0.8%, $Fe_2O_3$ and have a free acidity of 0.5 to 2%, for example 1% by weight. It is understood that the above percentage figures relate to the quantities expressed as oxides. The same convention is used throughout the following description unless the context requires otherwise.

Accordingly to the present invention, an aqueous acidic liquor is contacted with sufficient of a basic material to precipitate aluminium and iron values, usually as the hydroxides or hydrous oxides. It is a preferred feature of the invention that the basic material is selected to be capable of reacting with the aluminium and/or iron compounds in the liquor to produce soluble compounds containing the anions of the aluminium and/or iron compounds so that such anions remain mainly in solution in the mother liquor. The basic material is preferably a magnesium compound, such as magnesium carbonate suitably as magnesite, magnesium hydroxide or other suitable magnesium compound. It is found that basic calcium compounds are relative unsuitable for use in the practice of this invention. Calcium sulphate, for example, is sparingly soluble and gives separation problems. The precipitation of the iron and/or aluminium values may be conducted at ambient temperature or at the temperature of the acidic liquor which may, for example, be from 10° C. to 50° C. It is convenient to separate the precipitate by filtration although the separation may be accomplished by other means such as by settlement and decantation to produce a slurry which may or may not be further dewatered to produce a cake. In the case of magnesium compounds, the retention of a small amount of soluble magnesium in the cake or slurry by purposely conducting a less than complete separation of the mother liquor from the precipitate may be advantageous in its own right as will be described hereafter.

A typical composition for the filter-cake so produced from the sulphuric acid treatment of a montmorillonite mineral may be:

| | |
|---|---|
| $Al_2O_3$ | 2%–20% wt |
| $Fe_2O_3$ | 1%–15% |
| $SiO_2$ | 0.2%–5% |
| MgO | 0.5%–8% |
| Others | 5%–20% |
| Remainder | water |

The cake or slurry of aluminium and/or iron compounds produced as above described is preferably mixed with an appropriate quantity of sulphuric acid and water to dissolve the aluminium and/or iron compounds. A degree of self-heating during the dissolution, without causing boiling at the pressure at which the process is conducted, whether ambient or elevated pressure, may be achieved and is preferred. Preferably the sulphuric acid is diluted to a concentration such that a temperature of at least 50° C., particularly preferably at least 65° C. and very suitably at least 70° C., is generated. The upper temperature may suitably be below 95° C., particularly preferably below 85° C. It is therefore not usually necessary to add heat to maintain a sufficient dissolution temperature. A suitably diluted sulphuric acid concentration may be at least 45%, particularly preferably at least 50% and up to, for example, 65% by weight. The acid may be added either as concentrated acid in conjunction with the requisite quantity of water or as pre-diluted acid. The quantity of acid is preferably sufficient to achieve a free sulphuric acid content of at least 0.5%. While the content of free sulphuric acid may be up to even 5%, it is preferred that it be held at less than 1% by weight of the product solution. This minimum quantity of free acid is required to give stability to the product solution in storage. The acid treatment mixture may require to be maintained for at least 15 minutes and up to, for example, 1 hour under stirring to achieve the degree of dissolution. The solution of aluminium and/or iron sulphate may contain at least 0.5%, often at least 2% and up to 5% by weight of the solution of suspended solid matter and the solution is preferably treated to remove such suspended matter. This may be achieved by using a conventional filter press. The solution is then preferably polished by passing it through a suitable bag filter.

In the course of the acid treatment of the clay mineral, the acid dissolves some of the aluminium and most of the iron and it is found that, given suitable control of the dilution and other conditions during the sulphuric acid digestion stage and/or suitable selection of the composition of the acidic waste liquor or the variation of the composition by the addition of suitable acidic compounds of aluminium and/or iron to the liquor or to the precipitate, the relative proportion of these elements in the final product may be controlled. The content of aluminium and iron may be controlled from about 4.5%, preferably from 5%, to 8% wt $Al_2O_3$ and about 0.5%, preferably from 1%, to 3% wt $Fe_2O_3$ by such means. The product may also be controlled within or near the Draft European Standard Specification for an aluminium-iron sulphate potable water treatment agent which is 6.5 to 7.5% wt $Al_2O_3$ and 0.9 to 2.5% wt $Fe_2O_3$. It is preferred, however, to control the quantity of aluminium in the product solution at from 4.5% to below 6.5%, particularly preferably below 6.25%, by weight $Al_2O_3$, and the quantity of iron at from 0.7% to 2.5% by weight $Fe_2O_3$ to optimize storage stability and total aluminium/iron residual levels in water treated with the solution.

It has been found that the suspended matter removed from the aluminium-iron sulphate solution can be a valuable by-product of the invention. Where the acidic liquor is derived from the acid treatment of aluminosiliceous or aluminoferrosiliceous mineral, such as a suitable clay, this suspended matter is found to comprise a substantial or a major proportion of a siliceous material which has surface area and pore volume/diameter characteristics which make it an excellent bleaching agent for oils such as the triglyceride oils typified by the edible vegetable oils. The substantial quantity of this product, which had hitherto been dumped, gives a considerable added value to the invention. As a further feature of the invention, there is provided a process for the production of a bleaching agent by the above described means. Thus, the invention enables two valuable products to be produced from a waste product which had represented a substantial negative asset due to the cost of dumping.

It has been found that a small proportion of the structural silicon of the original clay mineral is present in soluble form in the product of this invention. This silicon may be present, typically, in at least 0.02 mg/kg, more generally in at least 0.05 mg/kg or more, calculated as Si and based on the weight of the product solution. One specific content which has been achieved in a process using montmorillonite as the starting mineral is 0.11 mg/kg Si. The presence of soluble silicon in drinking water may reduce the uptake of aluminium into the body. The use of the product of the invention as a water treatment product may release soluble silicon into the treated water and may have an effect in reducing the biological impact of dissolved aluminium. Alternatively, the soluble silicon may be removed from the product solution.

If magnesium sulphate solution has not been initially completely removed from the precipitate of aluminium and/or iron compounds, a small controllable quantity of this compound will persist in the final product solution. The product may be used to treat run-off water containing phosphate, the magnesium sulphate tending to react to cause precipitation of magnesium phosphate. This route to the removal of phosphate is a considerably advantage. The content of magnesium sulphate should preferably by 0.2% to 2.0%, for example from 0.5% to 1.5%, calculated as MgO and based on the weight of the solution.

The advantages accruing from the presence of soluble silicon or magnesium apply over the entire compositional scope of the present invention.

It will be apparent to those skilled in the art that, using the same principles, an iron sulphate water-treatment agent may be produced from iron-rich acidic mine sludges or liquors from pickling liquors or from other acidic liquors containing dissolved iron compounds.

The activity of the water-treatment agents produced according to the invention may be enhanced by the addition of a cationic polymer. Such a polymer preferably has a charge density of form 4 to 24 meq/g and a molecular weight below about 100,000 and such that the polymer is water-soluble. The polymer may be added an effective quantity up to about 8% or 10% for example in at least 1% wt. based on the total solution. The optimal quantity of polymer may be in the region of 4%–5%.

The products of this invention are effective water treatment agents having a number of advantages in use over traditional water-treatment agents such as aluminium sulphate, ferric sulphate or ferric chloride. Further, the activity of these water-treatment agents may be greatly enhanced by modification with a cationic polymer. Such a polymer preferably has a cationic charge density of from 4 to 24 meq/g, particularly preferable of at least 7 meq/g, and a molecular weight preferably below about 100,000 and such that the polymer is water-soluble. The polymer may be added to the product solution in an effective quantity up to about 8% or 10% for example in at least 1% wt. based on the total solution. The optimal quantity of polymer may be in the region of 4%–5%. Examples of suitable polymers may be selected from the polyethyleneamines, the polyamidoamines, the polyvinylamines and the polydiallyl ammonium compounds. A particularly suitable cationic polymer is polydiallyldimethyl ammonium chloride (polyDADMAC) or suitable polyamidoamines available under the Trade Mark POLYMIN. The polymer-modified products of this invention have a water-treatment performance which greatly exceeds that of the non-modifies products and compares well with that of polyaluminium chloride (PAC).

Some of the advantages mentioned above may be evident in the treatment of particular waters. Some waters have an alkaline or approximately neutral pH. Ferric sulphate has an optimum performance for organics removal at a coagulation pH of about 5.0 to 5.5 and it is therefore usual to dose the water with acid to adjust the pH to the effective range. This is expensive in material and plant terms. The product of this invention gives optimal aluminium residual levels at a pH of about 6.5 to 7.5 which reduces or eliminates the acid demand of the process. In some respects, the product of this invention is very similar in performance to aluminium sulphate. However, at least at a pH of about 6.5 to 7, the aluminium residuals attainable by the use of the product of this invention are lower than those attainable by the use of aluminium sulphate to an extent which is greater than could be expected from the lower aluminium content of the present product. The colour or phosphate removal of water treated with the product of this invention may be better than those attainable using ferric chloride and a lower sludge weight and volume is obtained than when using either ferric product. At the preferred composition range, the product of this invention particularly optimizes aluminium residual values. If more iron were present the turbidity of the treated water would be adversely affected making an acid adjustment necessary. The use of waste raw material also gives the product of the invention an inbuilt economic advantage.

The invention will now be illustrated by reference to Examples of water treatment using the product of the invention and, for comparative purposes, competitive water treatment agents. The product of the invention was a clear aqueous solution containing 6 wt. % $Al_2O_3$, 2 wt. % $Fe_2O_3$, 1.5 wt. % MgO, 0.5 wt. % free sulphuric acid and 0.1 mg/kg soluble silica and having a specific gravity of 1.32. This product was produced from the acidic liquor resulting from the sulphuric acid treatment of a montmorillonite clay mineral with appropriate additions of aluminium sulphate, ferric sulphate and water to attain the desired product composition. Magnesium hydroxide was used to precipitate the aluminium/iron values with separation of the precipitate from the mother liquor containing dissolved magnesium sulphate by filtration. The filter cake was water-washed, redissolved in 96% wt. sulphuric acid and the resulting solution was again filtered free of residual solids, including silica. A portion of the product was treated by dissolving in it 4% wt. of polyDADMAC.

EXAMPLES 1(a) to 1(f)

The water to be treated was a surface water having a pH of 8.2, a colour of 50.4 Hazen, a turbidity of 4.8 NTU, a % UV transmission of 69.2, an alkalinity of 210 mg $CaCO_3$, a hardness of 250 mg $CaCO_3$, a phosphate content of 3.5 mg/l $PO_4$, an iron content of 0.04 mg/l, an aluminium content of 0.15 mg/l and a manganese content of 0.015 mg/l.

The product of this invention was used to treat samples of this water at a product concentration of 0.04 wt. % and at a dose varying from 30 to 80 mg/l. The treated water was examined for floc quality (A to F) after a given time of flocculation at 60 rpm or 15 rpm and for various other features after 30 minutes settlement. The results are given in Table 1.

TABLE 1

| | | Example No. | | | | | |
|---|---|---|---|---|---|---|---|
| | | 1 (a) | 1 (b) | 1 (c) | 1 (d) | 1 (e) | 1 (f) |
| Dose mg/l | | 30 | 40 | 50 | 60 | 70 | 80 |
| 60 rpm | 3 min | A | A | A | A | A | A/B |
| 15 rpm | 2 min | A | A | A | A/B | B | C |
| | 5 min | A | A | A/B | B/C | C | D |
| | 10 min | B | C | C/D | D | D/E | E |
| | 15 min | C | D | D | D/E | E | E/F |
| | 20 min | C/D | D | D/E | E | F | F |
| After 30 min | pH | 7.1 | 7.1 | 7.1 | 7.1 | 7.1 | 7.1 |
| | Colour (H) | 10.2 | 9.3 | 9 | 8.1 | 7.5 | 6.6 |
| | Turbid (NTU) | 1.4 | 1.2 | 1.1 | 1 | 0.9 | 0.8 |
| | Al (mg/l) | 0.02 | 0.03 | 0.02 | 0.02 | 0.03 | 0.04 |
| | Fe (mg/l) | 0.03 | 0.02 | 0.02 | 0.02 | 0.02 | 0.01 |
| | Filtered Turbid | 0.09 | 0.08 | 0.08 | 0.07 | 0.07 | 0.06 |
| | $PO_4$ (mg/l) | 0.38 | 0.34 | 0.3 | 0.18 | 0.1 | 0.1 |
| | UV Transmission % (at 254 nm) | 80.9 | 81.8 | 82.1 | 83.3 | 84.1 | 85.2 |

EXAMPLE 2

Samples of a soft upland water were dosed at a pH of 5.5 with varying quantities of the product of this invention or of aluminium sulphate. The residual aluminium values after treatment was measured and are set out in Table 2.

TABLE 2

| Dose mg/l | 40 | 50 | 55 | 60 | 65 | 70 | 75 |
|---|---|---|---|---|---|---|---|
| Inv. | 0.11 | 0.11 | | 0.04 | | 0 | |
| Al. Sulph. | 0.08 | | 0.14 | | 0.15 | | 0.21 |

EXAMPLE 3

This was a plant trial of the replacement of a treatment level of 40 mg/l aluminium sulphate by the same dosage of the product of the invention in the treatment of Dee water (Chester). A series of samples of the final treated water were taken over a period of days both before and after the replacement and were analyzed for residual aluminium, iron and magnesium and were examined for colour and turbidity removal. The results showed comparable performance between the two treatment agents for organics/colour removal and for clarifier and final turbidities. The residual aluminium levels in the clarifier were 28% lower and when using the product of this invention. When using the product of this invention, the average final aluminium level was the same as that of the raw water, the final iron level was lower than that of the raw water and there was no contribution to manganese levels.

EXAMPLE 4

The cationic polymer modified product of this invention was tested against polyaluminium chloride (PAC) as well as against the non-modified product of the invention in the treatment of water have a pH of 7.5. The parameters measured were residual aluminium, turbidity and colour at various treatment levels. The modified product showed considerable advantage over the non-modified product and gave lower aluminium levels and colour than PAC although slightly inferior turbidity. The results are set out in Table 3.

TABLE 3

| Example | 4 (a) | 4 (b) | 4 (c) | 4 (d) | 4 (e) | 4 (f) | 4 (g) |
|---|---|---|---|---|---|---|---|
| Dose mg/l | 0 | 30 | 40 | 50 | 60 | 70 | 80 |
| COLOUR | | | | | | | |
| Inv. | 20.2 | 5.6 | 5.3 | 5 | 5 | 4.5 | 4.5 |
| Mod-Inv. | 20.2 | 4.2 | 3.9 | 3.9 | 3.6 | 3.4 | 3.6 |
| PAC | 20.2 | 4.8 | 4.5 | 4.2 | 4.2 | 3.9 | 3.6 |
| TURBIDITY | | | | | | | |
| Inv. | 1.9 | 0.9 | 0.8 | 0.7 | 0.7 | 0.8 | 0.7 |
| Mod-Inv. | 1.9 | 0.6 | 0.5 | 0.4 | 0.5 | 0.4 | 0.3 |
| PAC | 1.9 | 0.5 | 0.4 | 0.3 | 0.2 | 0.2 | 0.2 |

| Example No. | 4 (f) | 4 (g) | 4 (h) | 4 (j) | 4 (k) | 4 (l) |
|---|---|---|---|---|---|---|
| Dose mg/l | 70 | 80 | 90 | 100 | 110 | 120 |
| Al. RESID. | | | | | | |
| Mod-Inv. | 0.08 | 0.09 | 0.07 | 0.05 | 0.07 | 0.08 |
| PAC | 0.14 | 0.14 | 0.1 | 0.1 | 0.11 | 0.08 |

We claim:

1. A process for the treatment of aqueous acidic liquors containing dissolved aluminum and/or iron compounds to produce an aluminum and/or iron sulphate water-treatment product, comprising the steps of:
   a) contacting the liquor with an effective amount of a basic magnesium compound to react with the dissolved aluminum and/or iron compounds and precipitate aluminum and/or iron values;
   b) separating the precipitate in the form of a cake or slurry from the remaining liquor;
   c) treating the cake or slurry with sulfuric acid to re-dissolve aluminum and/or iron values to thereby produce a solution of aluminum and/or iron sulfate containing free sulfuric acid; and
   d) separating suspended solid matter from the solution.

2. A process as claimed in claim 1, wherein the acidic liquor is an acid treatment product of an aluminosiliceous or an aluminoferrosiliceous material.

3. A process as claimed in claim 1, wherein the acidic liquor is a pickling liquor or a mine drainage liquor containing ferrous or ferric iron.

4. A process as claimed in claim 1, wherein the acidic liquor has a free acidity of 0.25% to 2%.

5. A process as claimed in claim 1, wherein the dissolved aluminum and/or iron compounds are in the form of the sulfates or chlorides.

6. A process as claimed in claim 1, wherein the composition of the acidic liquor is controlled such that the cake or slurry for redissolution contains 2% to 20% by weight $Al_2O_3$, 1% to 15% by weight $Fe_2O_3$, 0.2% to 5% by weight $SiO_2$, 0.5% to 8% by weight MgO and 5% to 20% by weight of other constituents including free sulfuric acid and water.

7. A process as claimed in claim 1, wherein the suspended solid matter comprises silica having oil bleaching activity.

8. A water treatment product comprising the solution produced by the process of claim 1.

9. A water treatment product as claimed in claim 8, wherein the solution comprises 1% to 10% by weight of a water soluble cationic polymer.

10. A water treatment product as claimed in claim 9, wherein the polymer has a charge density of 4 to 24 meq/g and/or a molecular weight below 100,000.

11. A process for treating water comprising adding to the water an effective floc forming quantity of a treatment product as claimed in claim 8 and removing flocs from the water.

12. The process of claim 1 wherein the magnesium compound comprises magnesium carbonate or magnesium hydroxide.

13. A water treatment product comprising the solution produced by the process of claim 1, wherein the solution contains 4.5% by weight to less than 6.5% by weight $Al_2O_3$, and from 0.7% by weight to 2.5% by weight $Fe_2O_3$ including free sulfuric acid.

14. A water treatment product comprising the solution produced by the process of claim 1, wherein the solution contains 4.5% by weight to 8% by weight $Al_2O_3$, from 1% by weight to 3% by weight $Fe_2O_3$, and 0.02 mg/kg to 0.5 mg/kg silicon in soluble form including free sulfuric acid.

15. A water treatment product as claimed in claim 14, wherein the solution contains from 0.2% by weight to 2% by weight MgO.

* * * * *